(12) United States Patent
Tollner

(10) Patent No.: US 8,070,459 B2
(45) Date of Patent: Dec. 6, 2011

(54) PRESSURE CONTROL METHOD

(75) Inventor: Martin Ernst Tollner, Eastbourne (GB)

(73) Assignee: Edwards Limited, Crawley, West Sussex (GB)

( * ) Notice: Subject to any disclaimer, the term of this patent is extended or adjusted under 35 U.S.C. 154(b) by 982 days.

(21) Appl. No.: 10/586,200

(22) PCT Filed: Jan. 14, 2005

(86) PCT No.: PCT/GB2005/000124
§ 371 (c)(1),
(2), (4) Date: Jul. 14, 2006

(87) PCT Pub. No.: WO2005/071509
PCT Pub. Date: Aug. 4, 2005

(65) Prior Publication Data
US 2007/0163330 A1    Jul. 19, 2007

(30) Foreign Application Priority Data
Jan. 22, 2004    (GB) .................................. 0401396.7

(51) Int. Cl.
*F04B 43/12*    (2006.01)
*F04B 49/06*    (2006.01)

(52) U.S. Cl. .......................................... 417/53

(58) Field of Classification Search ............... 417/53, 417/302, 20, 36, 42, 43, 44.2; 137/14, 565.23, 137/565.29, 565.3
See application file for complete search history.

(56) References Cited

U.S. PATENT DOCUMENTS

| | | | |
|---|---|---|---|
| 4,850,806 A * | 7/1989 | Morgan et al. .................. 417/53 |
| 5,039,280 A * | 8/1991 | Saulgeot et al. .............. 417/205 |
| 5,150,734 A * | 9/1992 | Chiba ....................... 137/565.33 |
| 5,259,735 A * | 11/1993 | Takahashi et al. ............. 417/203 |
| 5,746,581 A * | 5/1998 | Okumura et al. ................. 417/2 |
| 5,758,680 A | 6/1998 | Kaveh et al. |
| 5,803,107 A | 9/1998 | Kaveh et al. |
| 5,944,049 A * | 8/1999 | Beyer et al. ................. 137/487.5 |
| 6,004,109 A * | 12/1999 | Gebele et al. .................. 417/243 |
| 6,030,181 A * | 2/2000 | Conrad ............................ 417/53 |
| 6,142,163 A * | 11/2000 | McMillin et al. ............... 137/14 |

(Continued)

FOREIGN PATENT DOCUMENTS

| | | |
|---|---|---|
| JP | 6-259144 | 9/1994 |
| JP | 2000-200780 | 7/2000 |
| JP | 2001-51723 | 2/2001 |
| WO | WO 2004/001230 A1 | 12/2003 |

OTHER PUBLICATIONS

Suzuki Sadayuki; Abstract of JP 6259144 A, "High-Speed Pressure Control Method," Sep. 16, 1994; Kokusai Electric Co Ltd.

(Continued)

*Primary Examiner* — Devon C Kramer
*Assistant Examiner* — Amene Bayou

(57) ABSTRACT

The present invention relates to a method of setting the pressure in a chamber of a vacuum system to a required pressure, the system comprising a pressure control system including a pump for evacuating gas from the chamber and a flow controller for allowing the flow of gas into the chamber, the method comprising setting an initial flow into and/or out of the chamber for achieving a pressure above the required pressure so as to increase the rate of pressure increase, the initial flow occurring over a transient period which does not allow the pressure to exceed the required pressure, and setting a preset flow into and/or out of the chamber after the transient period has elapsed for achieving and maintaining the required pressure.

21 Claims, 9 Drawing Sheets

U.S. PATENT DOCUMENTS

| | | | |
|---|---|---|---|
| 6,200,107 B1 * | 3/2001 | Brewster | 417/251 |
| 6,419,455 B1 * | 7/2002 | Rousseau et al. | 417/36 |
| 6,474,949 B1 * | 11/2002 | Arai et al. | 417/2 |
| 6,782,907 B2 * | 8/2004 | Kawasaki et al. | 137/12 |
| 6,966,967 B2 * | 11/2005 | Curry et al. | 156/345.26 |
| 7,077,159 B1 * | 7/2006 | Reimer et al. | 137/565.23 |
| 7,101,155 B2 * | 9/2006 | Savidge et al. | 417/53 |
| 7,472,581 B2 * | 1/2009 | Kitazawa et al. | 73/49.2 |
| 2002/0094306 A1 | 7/2002 | Hara et al. | |
| 2002/0098708 A1 * | 7/2002 | Kumihashi et al. | 438/714 |

OTHER PUBLICATIONS

Imaoka Tetsuo, Miyata Takeshi; Abstract of JP 2001051723 A, "Flow Rate Controller and Flow Rate Controlling Method," Feb. 23, 2001; Matsushita Electronics Corp.

Nitta Takehisa, Omi Tadahiro; Abstract of JP 200200780 A, "Manufacturing Equipment of Semiconductor or Liquid Crystal, and Method for Vaporizing Liquid Material Gas," Jul. 18, 2000; Omi Tadahiro; Ultra Clean Technology Kaihatsu Kenkyusho:KK.

United Kingdom Search Report of Application No. GB 0401396.7; Date of search: May 25, 2004.

PCT Notification of Transmittal of the International Search Report and the Written Opinion of the International Searching Authority, or the Declaration Of International Application No. PCT/GB2005/000124; Date of mailing: Apr. 21, 2005.

PCT International Search Report of International Application No. PCT/GB2005/000124; Date of mailing of the International Search Report: Apr. 21, 2005.

PCT Written Opinion of the International Searching Authority of International Application No. PCT/GB2005/000124; Date of mailing: Apr. 21, 2005.

* cited by examiner ively low (less than two seconds). The second factor is dependent on the mass flow rate into the system ($Q_{in}$), the mass flow rate of the system ($Q_{out}$) and the volume of the chamber $V_0$.

PRESSURE CONTROL METHOD

FIELD OF THE INVENTION

The present invention relates to a pressure control method, particularly, although not exclusively, for a vacuum chamber of a semiconductor or a flat panel display manufacturing assembly.

BACKGROUND OF THE INVENTION

FIG. 1 shows a vacuum system having a chamber 12, with volume $V_0$, and a pressure control system 10 for controlling the pressure in the chamber. A vacuum pump 14 having a pumping speed $S_{pump}$ is connected to a chamber outlet 16 via a duct 18 for evacuating gas from chamber 12. A valve 20 with variable conductance $C_{valve}$ controls gas flow from chamber 12 to pump 14. Valve 20 is usually a throttle valve, as shown, having a moveable vane for changing $C_{valve}$. A pressure gauge 22 monitors the pressure P in chamber 12 and a pressure control unit 24 controls $C_{valve}$ according to the monitored pressure P. The flow of process gas at a mass flow rate $Q_{in}$ into chamber 12 is controlled by mass flow controller 26. Process gas is evacuated from chamber 12 at a mass flow rate $Q_{out}$, which is determined by the product of the pressure in the chamber and the effective pumping speed $S_{eff}$. The effective pumping speed is:

$$S_{eff} = \frac{1}{\frac{1}{S_{pump}} + \frac{1}{C_{System}} + \frac{1}{C_{Valve}}}$$

where $C_{system}$ is the conductance of the vacuum system upstream of the valve.

In operation, pump 14 evacuates chamber 12 to a predetermined low pressure and pressure control system 10 incrementally increases the pressure in chamber 12 to allow each processing step to be performed at its required pressure. Pressure change occurs according to:

$$\frac{\partial P}{\partial t} = \frac{Q_{In} - Q_{out}}{V_0}$$

Accordingly, when $C_{valve}$ is decreased to a predetermined conductance, the effective pumping speed is decreased, and therefore $Q_{out}$ decreases. A reduction in $Q_{out}$ means that the mass of gas in the chamber increases, and therefore chamber pressure increases. It should be noted though that since the chamber pressure increases when $S_{eff}$ decreases (and $Q_{out}$=pressure×$S_{eff}$), the rate of change of chamber pressure decreases until it stabilises at a steady pressure. Accordingly, a reduction in $C_{valve}$ to a predetermined conductance causes the pressure to increase and stabilise at a set pressure. The change in $C_{valve}$ required for each incremental increase in pressure can be predetermined by experimentation or by modelling. $C_{valve}$ is changed by altering the position of, for instance, a vane of the valve mechanism.

The time taken for a pressure increase to occur depends on the time it takes for valve 20 to change to a predetermined conductance; and the rate of pressure increase for a fixed valve position and process gas mass flow rate (i.e. the time taken for the pressure to increase once the valve has been changed to the predetermined conductance). The first factor is dependent on the specific design of the valve and is typically very low (less than two seconds). The second factor is dependent on the mass flow rate into the system ($Q_{in}$), the mass flow rate of the system ($Q_{out}$) and the volume of the chamber $V_0$.

For instance, as shown in FIG. 2, if a chamber pressure of 2.5 mbar is required for a specific processing step, the valve is set to a preset position so that $C_{valve}$ is decreased from 850 m³/hour to 50 m³/hour. Consequently, pressure P increases from 0.1 mbar to 2.5 mbar. In the example shown in FIG. 2, $V_0$ is relatively small and $Q_{in}$ is relatively high, and therefore pressure response time is limited by the response time of the valve. Accordingly, the pressure in the chamber reaches the required pressure of 2.5 mbar after 2 seconds i.e. the time taken for the valve 20 to reach its preset position.

However, if $V_0$ is relatively high or $Q_{in}$ is relatively low, pressure response time is increased. One type of chamber where $V_0$ is generally large is a chamber used for manufacturing flat panel displays. An example of slow pressure response time in a chamber is shown in FIG. 3. FIG. 3 shows pressure increase for a system where $V_0$ is 100 litres and $Q_{in}$ is 2 standard litres per minute. It will be seen that valve 20 reaches its preset position after about two seconds, but pressure P does not reach the required pressure until about 35 seconds.

It is desirable to provide a pressure control system and method capable of reducing pressure response times, particularly in chambers where $V_0$ is relatively high or $Q_{in}$ is relatively low.

SUMMARY OF THE INVENTION

The present invention provides a method of setting the pressure in a chamber of a vacuum system to a required pressure, the system comprising a pressure control system including a pump for evacuating gas from the chamber and a flow controller for allowing the flow of gas into the chamber, the method comprising setting an initial flow out of the chamber for achieving a pressure above the required pressure so as to increase the rate of pressure increase, the initial flow occurring over a transient period which does not allow the pressure to exceed the required pressure, and setting a preset flow out of the chamber after the transient period has elapsed for achieving and maintaining the required pressure.

Other preferred aspects of the invention are defined in the accompanying claims.

BRIEF DESCRIPTION OF THE DRAWINGS

In order that the present invention may be well understood, several embodiments thereof, which are given by way of example only, will now be described with reference to the accompanying drawings, in which.

DETAILED DESCRIPTION OF THE INVENTION

As indicated above, the rate of pressure increase in a chamber of a vacuum system is:

$$\frac{\partial P}{\partial t} = \frac{Q_{In} - Q_{out}}{V_0}$$

Figure 3:
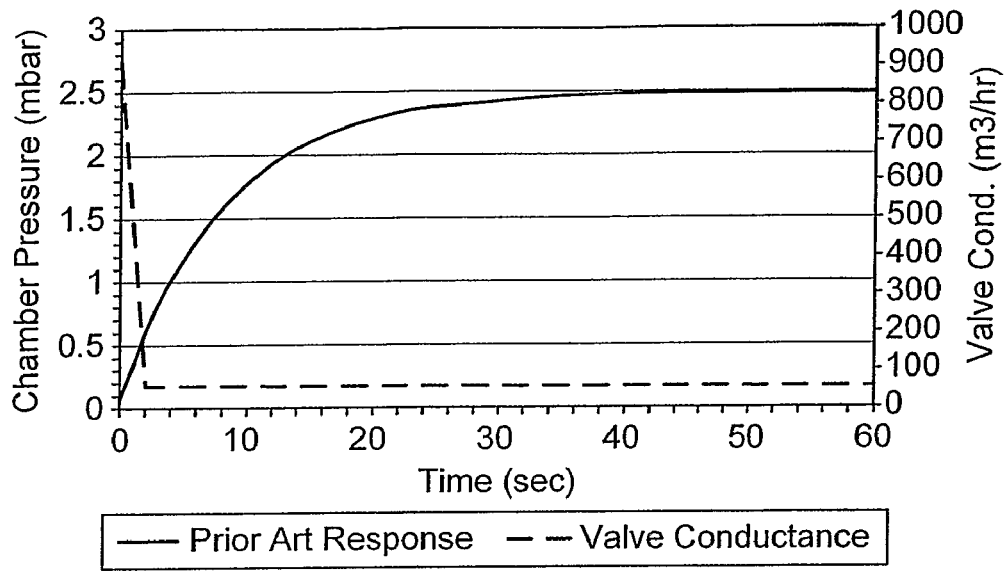
FIG. 3 is another graph showing chamber pressure and $C_{valve}$, against time, for a prior art pressure control method.

$V_0$ is constant for any given vacuum system and the difference between the flow of gas into and out of the chamber controls the build up of gas in the chamber and hence the rate of pressure increase. In the typical system shown in FIG. 1, the flow of gas out of the chamber ($Q_{out}$) is controlled by changing the valve conductance. When an increase in pressure is required the valve conductance is set to the predetermined conductance and the pressure is allowed to increase gradually and to stabilise at the required pressure (see FIG. 3). In the embodiments, an initial flow into ($Q_{in}$) and/or out ($Q_{out}$) of the chamber 12 is set to achieve a pressure above the required pressure so as to increase the rate of pressure increase. The initial flow occurs over a transient period and is selected so that the pressure does not exceed the required pressure. In this way, pressure increase in the chamber is quicker. Preferably, the initial flow is reduced to the predetermined flow when the required pressure is attained, to stabilise the chamber at the required pressure. Alternatively, the initial flow can be reduced to the predetermined flow before the required pressure is attained, and although the pressure increase would not be as quick as the preferred method, it would still be faster than the prior art method.

Figure 4:
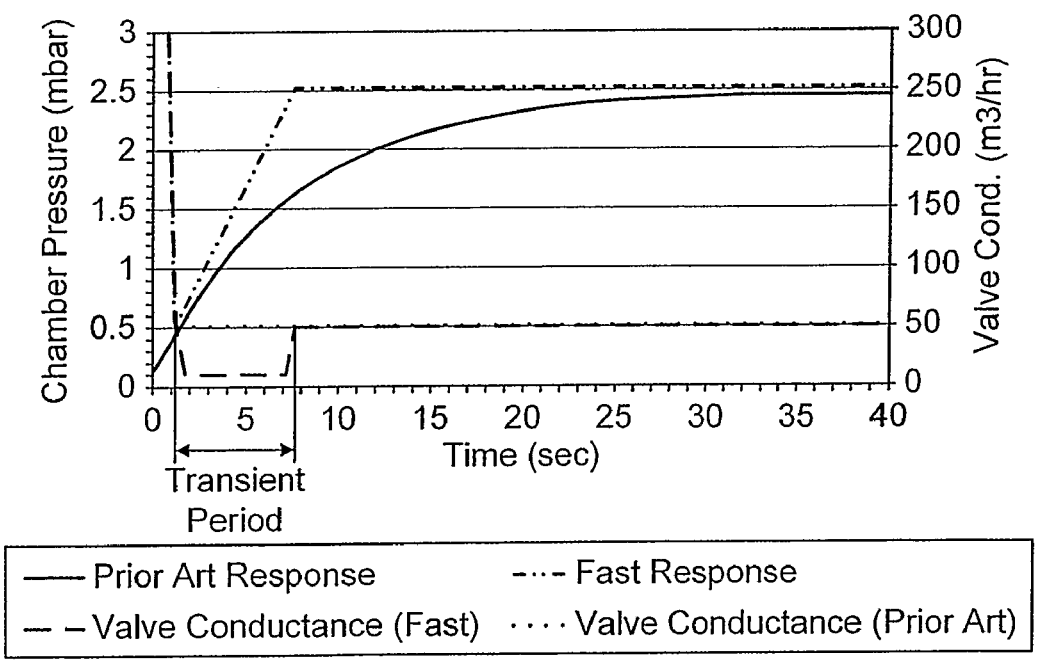
FIG. 4 is a graph showing chamber pressure and $C_{valve}$, against time, for a pressure control method according to a first embodiment of the present invention.

In a first pressure control method illustrated by FIG. 4, the valve is set to a preset conductance of 50 m³/hour. Such a valve conductance gradually increases the pressure in the prior art to a required pressure of 2.5 mbar after about 35 seconds, as shown by the prior art response curve superimposed on the graph. In the embodied method, $C_{valve}$ is reduced to an initial conductance which is well below the preset conductance for controlling the required pressure. Accordingly, the flow out ($Q_{out}$) is set below the predetermined flow out for the required pressure for a transient period of approximately six and a half seconds. Accordingly, the pressure increases to 2.5 mbar after only about 8 seconds. The length of the transient period is calculated according to the difference between the required pressure and the current pressure, the rate of pressure increase achieved by the initial valve conductance, and the speed of the valve. When $C_{valve}$ has been increased to 50 m³/hour, the pressure control unit controls $C_{valve}$ to compensate for fluctuations in pressure and to maintain the chamber at the required pressure. The embodiment provides an improvement of about 27 seconds.

Figure 5:
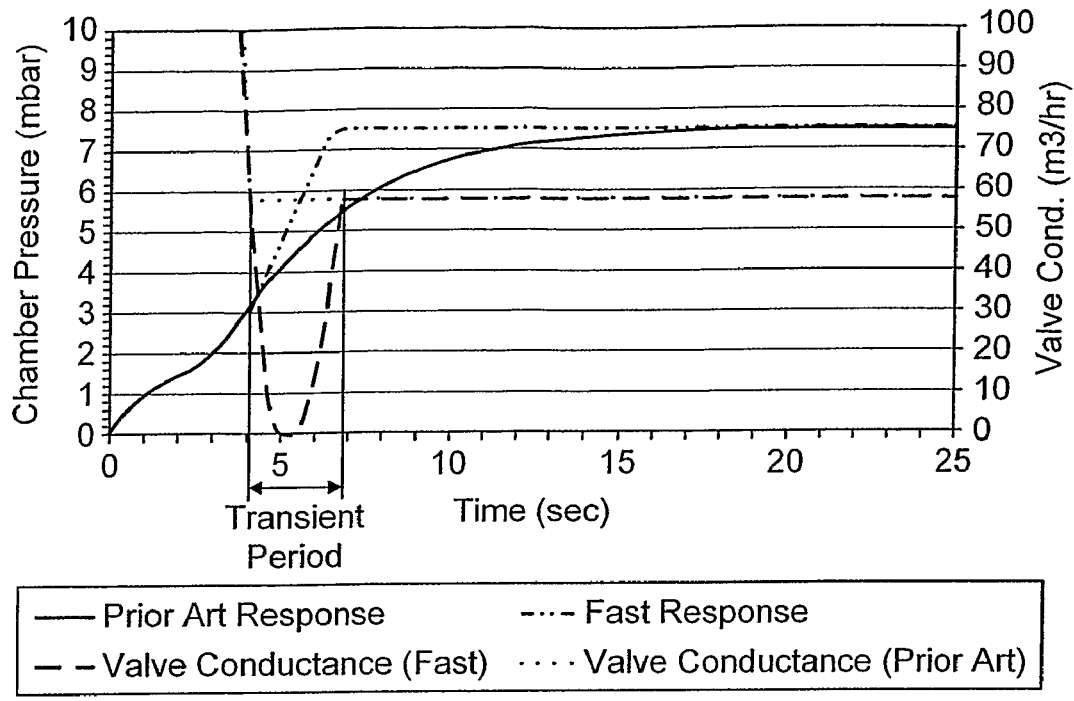
FIG. 5 is a graph showing chamber pressure and $C_{valve}$, against time, for a pressure control method according to a variation of the first embodiment.

In the embodiment illustrated by FIG. 4, $C_{valve}$ is reduced to an initial conductance of 10 m³/hour for a fixed time. The fixed time is slightly shorter than the transient period because the valve takes a finite time to move between positions i.e. from a conductance of 50 m³/hour to 10 m³/hour and back to 50 m³/hour. However, it is not necessary for $C_{valve}$ to be maintained at such an initial conductance value for any length of time, as will be appreciated from FIG. 5, which illustrates a variation of the embodiment. In FIG. 5, the preset $C_{valve}$ is 57 m³/hour for achieving a required pressure of 7.5 mbar. $C_{valve}$ is reduced below 57 m³/hour to 0 m³/hour and immediately increased to 57 m³/hour.

FIG. 5 shows $C_{valve}$ being reduced to a conductance of 0 m³/hour (valve fully closed) for increasing the rate of pressure increase. A reduction to 0 m³/hour decreases $Q_{out}$ to zero and therefore the rate of pressure increase is the maximum for this method and becomes:

$$\frac{\partial P}{\partial t}_{MAX} = \frac{Q_{In}}{V_0}$$

However, a reduction in $C_{valve}$ to any value between the predetermined conductance and 0 m³/hour provides a beneficial increase in the rate at which pressure increases. It should be noted however that it is advantageous to maintain $C_{value}$ at a steady state for a fixed time to ensure better control.

Figure 1:
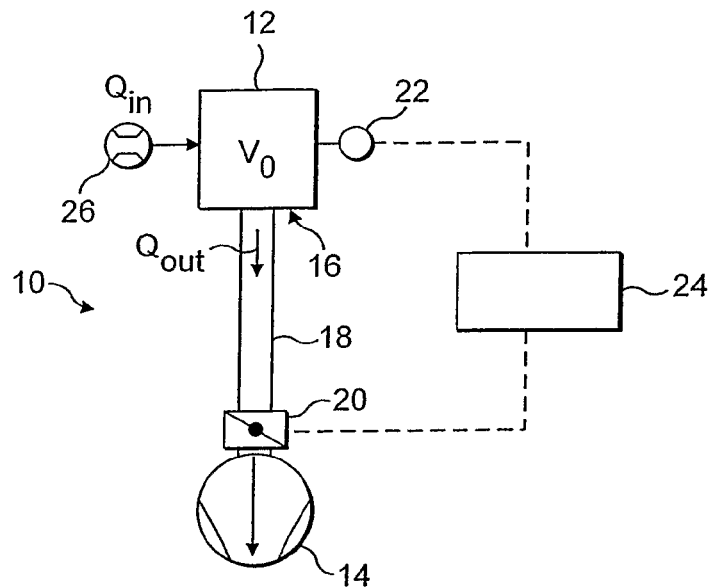
FIG. 1 shows a typical vacuum system.
Figure 2:
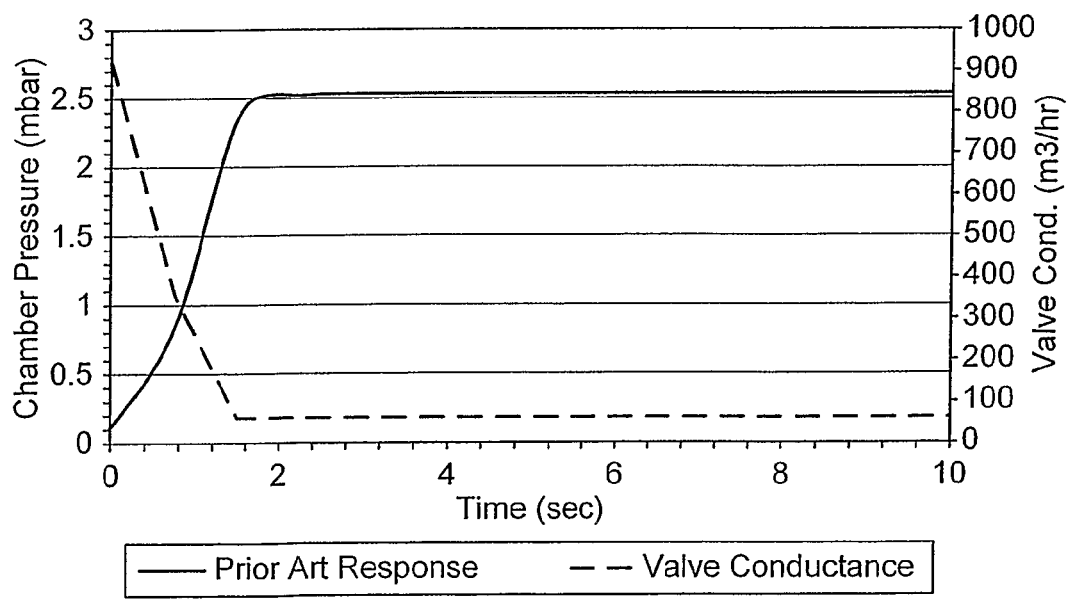
FIG. 2 is a graph showing chamber pressure and $C_{valve}$, against time, for a prior art pressure control method.
Figure 6:
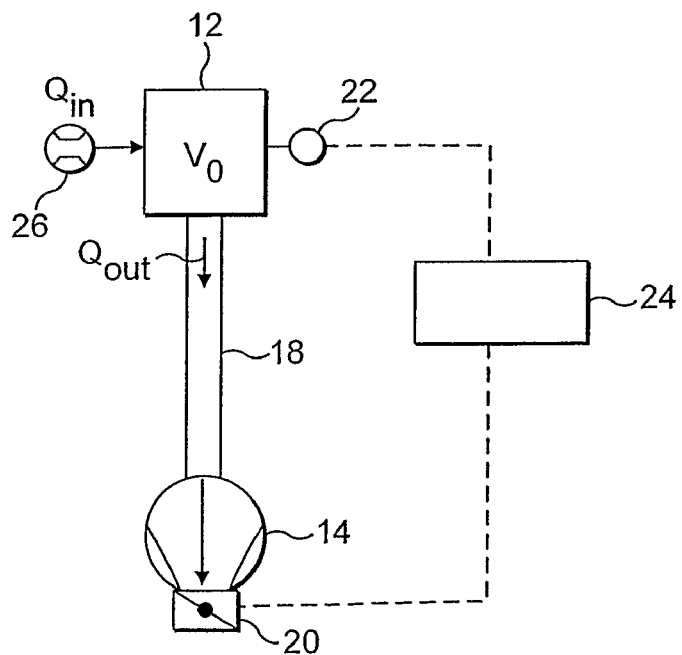
FIGS. 6 and 7 show two variations of the vacuum system shown in FIG. 1.
Figure 7:
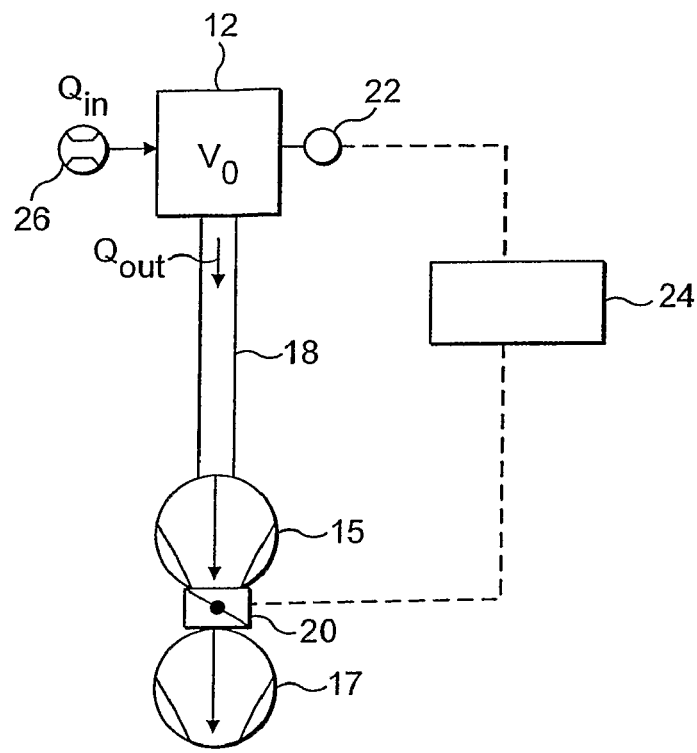

Two variations of the vacuum system shown in FIG. 1 are shown in FIGS. 6 and 7, by way of example. In FIG. 6, valve 20 is positioned down-stream of pump 14 and is operable for controlling the effective pumping speed and hence the pressure in chamber 12. In FIG. 7, the pump is shown having a high vacuum pump 15 and a backing pump 17, and the valve 20 is positioned between the two pumps and is operable for controlling the effective pumping speed.

A second embodiment will now be described with reference to FIGS. 8 to 10.

Figure 8:
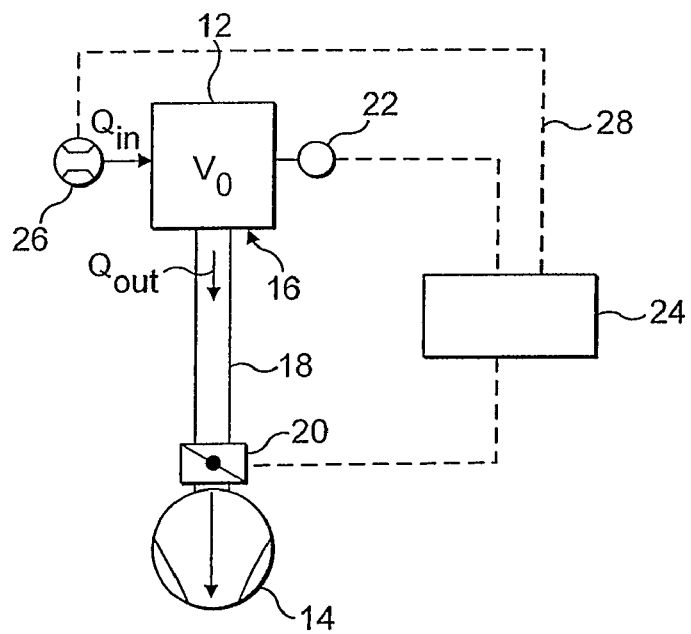
FIG. 8 shows a vacuum system for use with a method according to a second embodiment of the present invention.

FIG. 8 shows a vacuum system of a similar arrangement to that shown in FIG. 1. However, in addition to the FIG. 1 arrangement, FIG. 8 shows a connection 28 between pressure control unit 24 and mass flow controller 26. An increased rate of pressure increase is achieved by an increase in the mass flow of process gas ($Q_{in}$) into the chamber 12 for a transient period over and above the mass flow of process gas required for processing. The increase in $Q_{in}$ increases the differential flow ($Q_{in}-Q_{out}$) above the predetermined differential flow for the required pressure. In the example shown in FIG. 9, valve 20 is set to the predetermined position for a required pressure of 3.5 mbar. The process gas mass flow rate ($Q_{in}$) required for processing is two standard litres per minute (slpm). $Q_{in}$ is increased above two slpm for a transient period of about 5 seconds to increase the rate at which pressure increases over the rate at which pressure increases in the prior art as shown by the line superimposed in FIG. 9. The length of the transient period is calculated according to the difference between the required pressure and the current pressure, the rate of pressure increase achieved by the initial flow, and the speed of the mass flow controller. $Q_{in}$ is reduced to two slpm to coincide with the pressure in chamber 12 reaching the required pressure. In FIG. 9, $Q_{in}$ is increased to 20 slpm where it is maintained for a period just shorter than the transient period to allow a finite time for the mass flow rate to increase from and decrease to two slpm.

Figure 9:
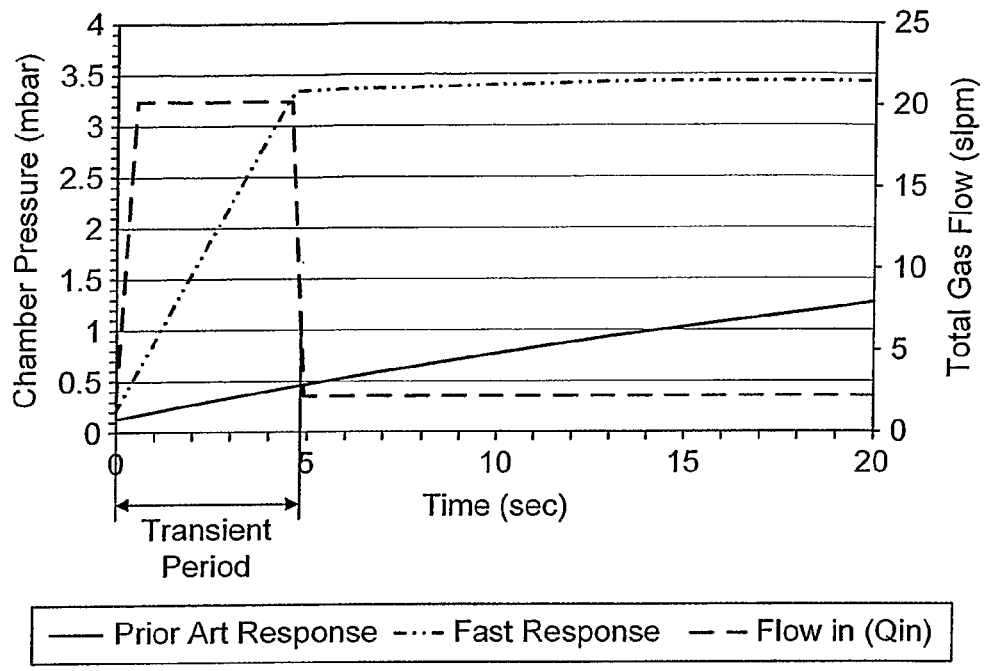
FIG. 9 is a graph showing chamber pressure and gas flow into the chamber, against time, for a pressure control method according to the second embodiment of the present invention.
Figure 10:
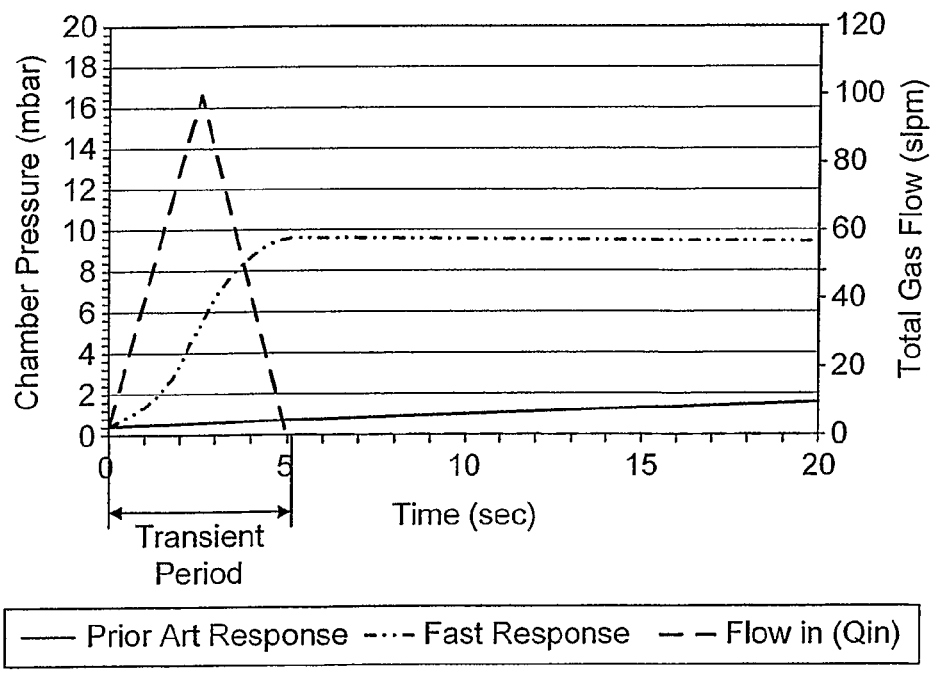
FIG. 10 shows a variation of the method shown in FIG. 9.

A variation in the method described in relation to FIG. 9 is described in relation to FIG. 10, wherein during the transient period, $Q_{in}$ is increased to a mass flow rate of 100 slpm and then immediately reduced to 2 slpm. It should be noted however that it is advantageous to maintain $Q_{in}$ at a steady state for a fixed time to ensure better control.

Figure 11:
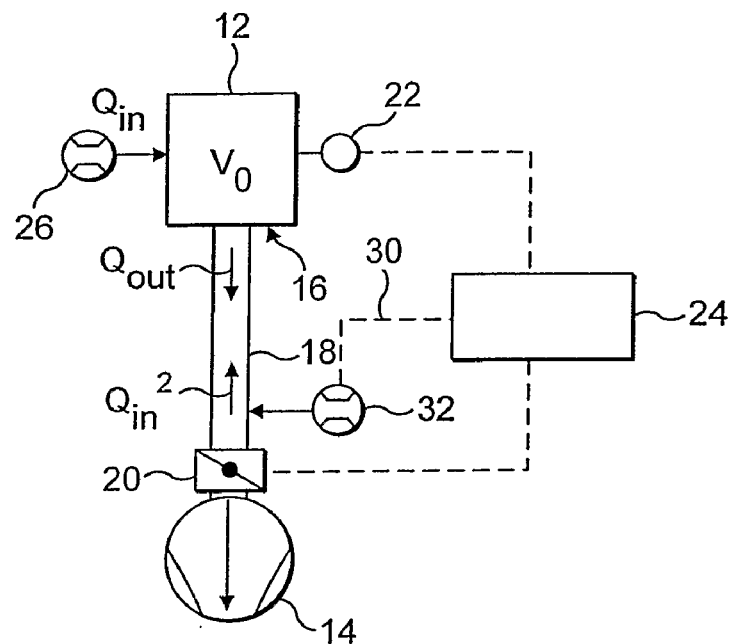
FIG. 11 shows a vacuum system for use with a method according to a third embodiment of the present invention.

A third embodiment is shown in FIG. 11, which differs from the arrangement in FIG. 1 in that a connection 30 connects pressure control unit 24 to purge mass flow controller 32. An increased rate of pressure increase is achieved by supplying purge gas ($Q_{in}^2$) into duct 18 upstream of valve 20 so that the purge gas increases the pressure in chamber 12. Purge gas is supplied for a transient period thereby increasing the differential flow rate (($Q_{in}+Q_{in}^2$)–$Q_{out}$) above the predetermined differential flow rate for maintaining the required pressure for processing. The supply of purge gas achieves similar results to those described with reference to FIGS. 9 and 10.

Figure 12:
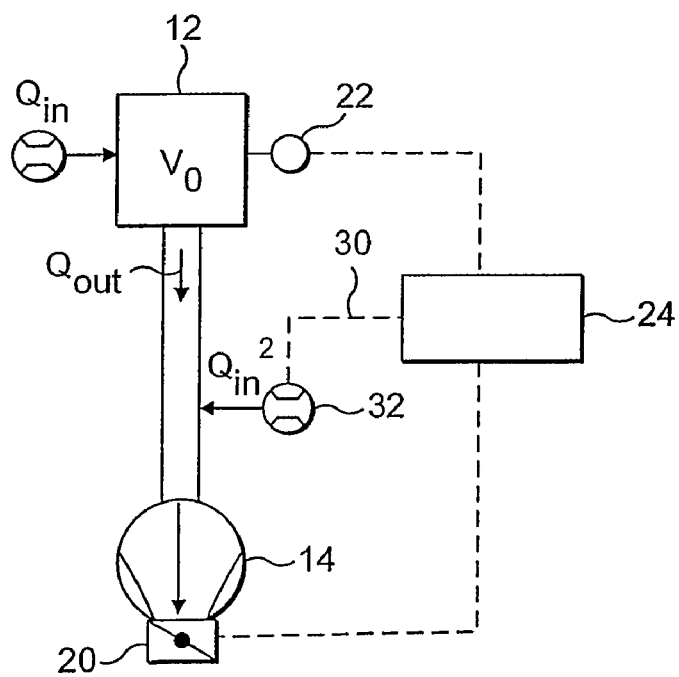
FIGS. 12 to 15 show variations of vacuum systems for use with the methods of the first to third embodiments.
Figure 13:
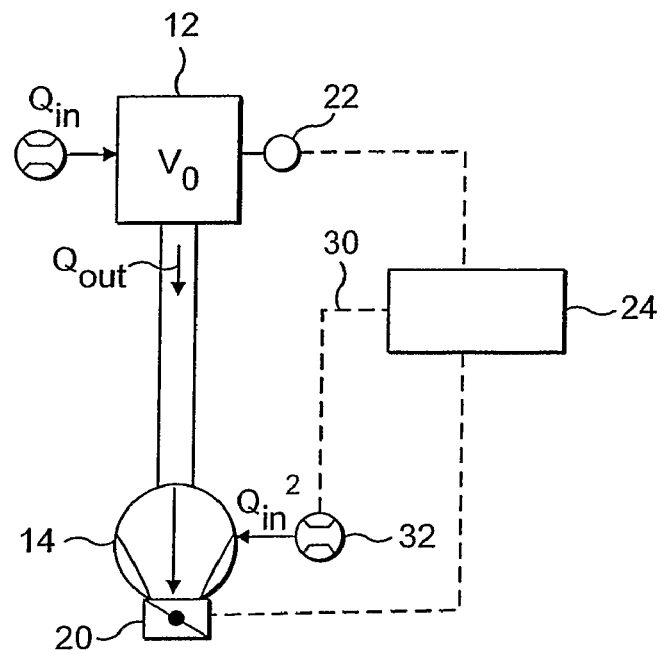
Figure 14:
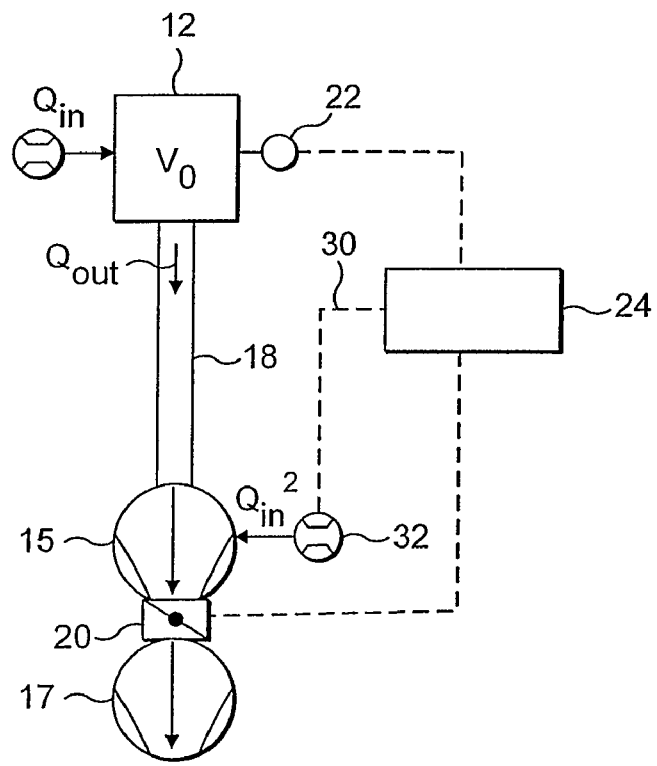
Figure 15:
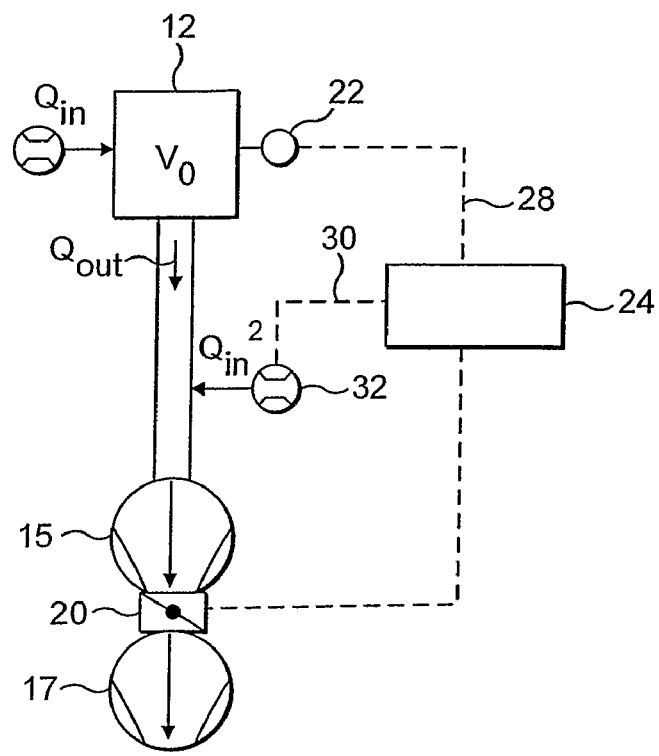

The embodiments described with reference to FIGS. 8 to 11 can be adopted alone or in combination with the valve control embodiment as described with reference to FIGS. 4 and 5. Such a combination of embodiments may be desirable if a very quick increase in pressure is required or if chamber 12 is very large or the mass flow rate for processing is very small. Four examples showing vacuum systems are shown in FIGS. 12 to 15. FIG. 12 differs from FIG. 11 in that valve 20 is downstream of pump 14. In FIG. 13, purge gas flow controller 32 is arranged to introduce gas directly into the pump 14. FIG. 14 shows an arrangement similar to FIG. 7 showing two pumps 15, 17. In FIG. 14 the purge gas flow controller 32 is arranged to introduce gas directly into the pump 15, and valve 20 is positioned between the two pumps. In FIG. 15, purge gas flow controller 32 is arranged to introduce gas upstream of high vacuum pump 15.

Figure 16:
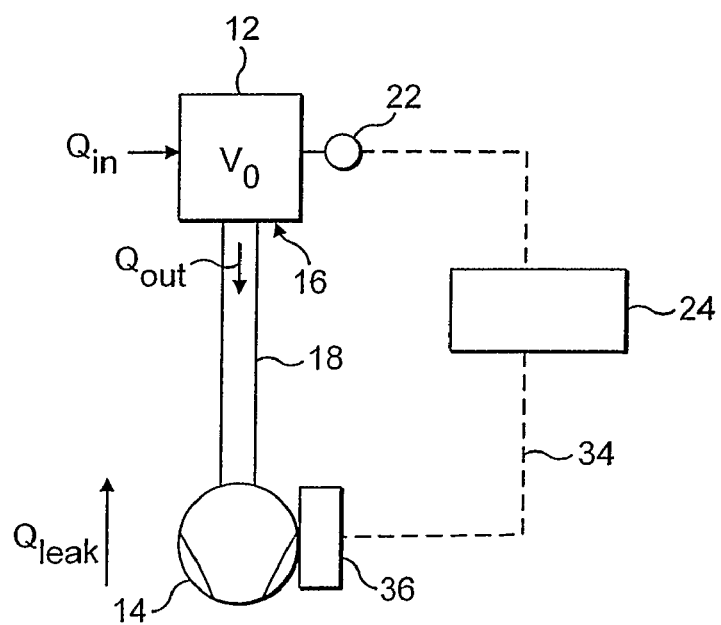
FIG. 16 shows a vacuum system for use with a method according to a fourth embodiment of the present invention.

A fourth embodiment is shown in FIG. 16, which differs from the arrangement shown in FIG. 1 in that a connection 34 is made between pressure control unit 24 and a pump inverter 36. Connection 34 enables the pressure control unit 24 to control the rotational speed of the pump 14 and hence the pumping speed ($S_{pump}$). Valve 20 is omitted from the arrangement. A decrease in $S_{pump}$ decreases the effective pumping speed and therefore increases the rate of pressure increase. Furthermore, decreasing the rotational speed of the pump 14 increases the mass flow rate of gas leaked upstream across the pump ($Q_{leak}$). Accordingly, the differential flow rate (($Q_{in}+Q_{leak}$)–$Q_{out}$) is further increased. The embodiment shown in FIG. 16, therefore, constitutes a combination of the valve conductance embodiment and the variable inlet gas flow embodiments.

In operation, the pumping speed $S_{pump}$ is decreased for a transient period below a predetermined pumping speed for achieving and maintaining a required chamber pressure. $S_{pump}$ can be decreased below the predetermined pumping speed to an initial preset where it is maintained for a period and then increased to the predetermined pumping speed. Alternatively, $S_{pump}$ can be decreased to a pumping speed and then immediately increased to the predetermined pumping speed. It should be noted however that it is advantageous to maintain pumping speed at a steady state for a fixed time to ensure better control. $S_{pump}$ is increased to the predetermined pumping speed before, or to coincide with, chamber pressure reaching the required pressure. Once the required chamber pressure has been achieved, pressure control unit 24 monitors chamber pressure P and adjusts pumping speed to compensate for pressure fluctuations.

The fourth embodiment can be used in combination with either or both of the embodiments described with reference to FIGS. 9 and 10, or the embodiment described with reference to FIGS. 4 and 5.

Figure 17:
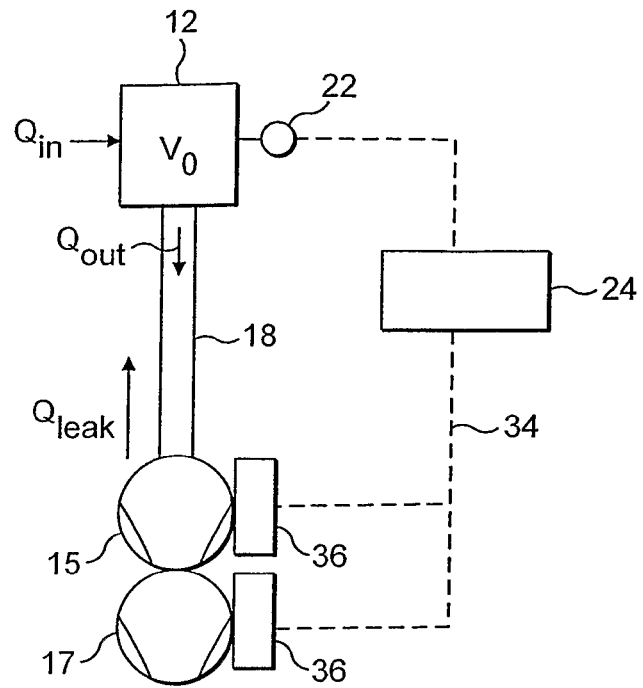
FIGS. 17 and 18 show variations of the vacuum system shown in FIG. 16.
Figure 18:
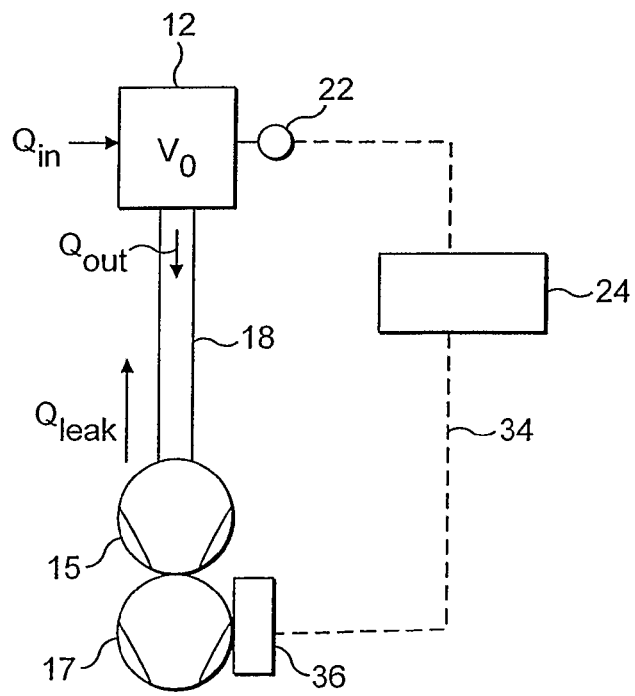

Variations of the fourth embodiment are shown in FIGS. 17 and 18. In FIG. 17, two inverters are operable for controlling two pumps 15 and 17. In FIG. 18, a single inverter is operable for controlling the downstream pump 17 only.

In summary, a method is provided for setting the pressure in a chamber of a vacuum system to a required pressure, the system comprising a pressure control system including a pump for evacuating gas from the chamber and a flow controller for allowing the flow of gas into the chamber. The method comprises setting an initial flow into and/or out of the chamber for achieving a pressure above the required pressure so as to increase the rate of pressure increase, the initial flow occurring over a transient period which does not allow the pressure to exceed the required pressure, and setting a preset flow into and/or out of the chamber after the transient period has elapsed for achieving and maintaining the required pressure.

While the foregoing description and drawings represent the preferred embodiments of the present invention, it will be apparent to those skilled in the art that various changes and modifications may be made therein without departing from the true spirit and scope of the present invention.

I claim:

1. A method of setting the pressure in a chamber of a vacuum system to a required pressure, the system comprising a pressure control system including a pump for evacuating gas from the chamber, a valve down stream of the pump, and a flow controller for allowing the flow of gas into the chamber, the method comprising:
    setting an initial flow out of the chamber to increase a rate of pressure increase, which, if allowed to sustain beyond a transient period, would have caused a pressure in the chamber to exceed the required pressure, and
    setting a preset flow out of the chamber after the transient period has elapsed for achieving and maintaining the required pressure higher than an initial pressure in the chamber at a moment when the initial flow is set,
    wherein the setting of a preset flow comprises varying a conductance of the valve down stream of the pump,
    wherein the chamber is specifically used in flat panel display processes,
    wherein during the transient period, a speed of the pump is reduced so that an amount of gas which leaks up-stream across the pump increases so as to increase the gas flowing into the chamber, thereby reducing the transient period for the initial pressure to increase to the required pressure.

2. The method according to claim 1 wherein the transient period elapses when the initial pressure has increased to the required pressure and the preset flow maintains the chamber at the required pressure.

3. The method according to claim 1 wherein setting the preset flow is attained by setting an effective pumping speed to a preset effective pumping speed, and the initial flow is attained by setting the effective pumping speed lower than the preset effective pumping speed during the transient period.

4. The method according to claim 3 wherein the effective pumping speed is controlled by reducing the speed of the pump.

5. The method according to claim 4 wherein setting the preset flow is attained by setting a preset speed of the pump and the initial flow is attained by reducing the speed of the pump below the preset speed during the transient period.

6. The method according to claim 3 wherein a valve controls the flow of gas out of the chamber, and the effective pumping speed is controlled by controlling the conductance of the valve.

7. The method according to claim 6 wherein attaining a preset flow is attained by setting a preset conductance of the valve and the initial flow is attained by reducing the conductance below the preset conductance during the transient period.

8. The method according to claim 6 wherein the valve is positioned up-stream of the pump.

9. The method according to claim 6 wherein the pump comprises a high vacuum pump and a backing pump and the valve is positioned between the high vacuum pump and the backing pump.

10. The method according to claim 1 wherein the flow controller varies the flow of gas into the chamber during the transient period.

11. The method according to claim 1 wherein a purge gas controller introduces gas into the pump during the transient period.

12. The method according to claim 1 wherein a purge gas controller introduces gas into the vacuum system up-stream of the pump during the transient period.

13. The method according to claim 1 wherein during the transient period the initial flow is maintained at a constant level for a fixed time.

14. A method according to claim 1 wherein during the transient period the initial flow is not maintained at a constant level.

15. The method according to claim 2 wherein setting the preset flow is attained by setting an effective pumping speed to a preset effective pumping speed, and the initial flow is attained by setting the effective pumping speed lower than the preset effective pumping speed during the transient period.

16. The method according to claim 15 wherein a valve controls the flow of gas out of the chamber, and the effective pumping speed is controlled by controlling the conductance of the valve.

17. The method according to claim 16 wherein attaining the preset flow is attained by setting a preset conductance of the valve and the initial flow is attained by reducing the conductance below the preset conductance during the transient period.

18. The method according to claim 7 wherein the valve is positioned up-stream of the pump.

19. The method according to claim 6 wherein the valve is positioned downstream of the pump.

20. The method according to claim 7 wherein the valve is positioned downstream of the pump.

21. The method according to claim 7 wherein the pump comprises a high vacuum pump and a backing pump and the valve is positioned between the high vacuum pump and the backing pump.

* * * * *